United States Patent
Brakus

(10) Patent No.: US 6,366,478 B1
(45) Date of Patent: Apr. 2, 2002

(54) CIRCUIT AND METHOD FOR AUTOMATIC RECTIFICATION IN CONVERTERS

(75) Inventor: Bogdan Brakus, Stockdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,345

(22) PCT Filed: Sep. 1, 1999

(86) PCT No.: PCT/DE99/02730

§ 371 Date: Mar. 16, 2001

§ 102(e) Date: Mar. 16, 2001

(87) PCT Pub. No.: WO00/16470

PCT Pub. Date: Mar. 23, 2000

(30) Foreign Application Priority Data

Sep. 16, 1998 (DE) .......................... 198 42 451

(51) Int. Cl.[7] .................................. H02M 3/335
(52) U.S. Cl. .................. 363/21.06; 363/21.01
(58) Field of Search .................. 363/20, 21.01, 363/21.04, 21.06, 21.14, 56.01, 56.09, 56.1, 56.11, 95, 97, 125, 127

(56) References Cited

U.S. PATENT DOCUMENTS

| | | | |
|---|---|---|---|
| 5,144,547 A | | 9/1992 | Masamoto |
| 5,430,640 A | | 7/1995 | Lee |
| 5,559,682 A | * | 9/1996 | Kanouda et al. ............ 363/21 |
| 5,726,869 A | * | 3/1998 | Yamashita et al. .......... 363/21 |
| 5,774,350 A | | 6/1998 | Notaro et al. |
| 5,886,881 A | * | 3/1999 | Xia et al. .................... 363/21 |
| 5,999,420 A | * | 12/1999 | Aonuma et al. ............. 363/21 |
| 6,163,467 A | * | 12/2000 | Kobayashi .................. 363/20 |

FOREIGN PATENT DOCUMENTS

| | | |
|---|---|---|
| DE | 43 15 906 | 11/1994 |
| JP | 06 343 262 | 12/1994 |
| JP | 09 056 155 | 2/1997 |

* cited by examiner

*Primary Examiner*—Matthew Nguyen
(74) *Attorney, Agent, or Firm*—Schiff Hardin & Waite

(57) ABSTRACT

A circuit and method for automatic rectification in a converter. The circuit is arranged in parallel to the secondary side of a transformer and acts as a free wheeling diode. The method uses a blocking signal from a current transformer to block the circuit when a current caused by a change in voltage on the primary side of the converter flows through the current transformer.

7 Claims, 5 Drawing Sheets

CIRCUIT AND METHOD FOR AUTOMATIC RECTIFICATION IN CONVERTERS

BACKGROUND OF THE INVENTION

1. Field of the Invention

The present invention generally pertains to converter circuits, and in particular to automatic rectification in converter circuits.

2. Discussion of the Related Art

A circuit arrangement for automatic rectification of voltages present at the secondary side of a transformer in a d.c. voltage/d.c. voltage converter is shown in FIG. 7 on pages 496–498 of the 1991 edition of the conference book INTELEC 91, CH 2970-2/910000-0495. In this circuit arrangement, rectification of voltages at the secondary side occurs using two circuit elements that are cross-driven. Thus, control voltages for the respective control input of the circuit elements are taken at the terminals of the coils of the transformer arranged at the secondary side.

This known circuit arrangement has the disadvantage that the control voltage for the circuit elements is not kept constant and is present during the entire switching cycle. This circuit arrangement is also inappropriate for low voltage converters. Given a voltage such as 2.5 or 1.8 volt, a sufficient driving is no longer present for the rectifiers on the secondary side of the converter.

The published patent application German 43 15 906 discloses a current supply circuit having an inductive circuit element for storing electrical energy with a circuit device for periodically supplying the energy to the circuit element. Given this circuit arrangement, occurring transverse currents are prevented by a logical blocking circuit. The free-wheel rectification component is controlled on the basis of this blocking circuit, which is comprising a plurality of gate elements and driver elements. The blocking circuit is driven via a plurality of circuit units.

A control voltage that is too low results in an insufficient modulation of the circuit elements. The efficiency of the circuit worsens as a result of the insufficient modulation.

SUMMARY OF THE INVENTION

Accordingly, it is an object of the present invention to offer a circuit and method for automatic rectification in converters for low output voltages.

It is another object of the present invention to offer a circuit and method for automatic rectification in converters, wherein the circuit elements are securely modulated for low output voltages.

It is a further object of the present invention to offer a circuit and method for automatic rectification in converters that requires very little capital outlay.

These and other objects of the invention will become apparent from a careful review of the following detailed description of the preferred embodiment, which is to be read in conjunction with a review of the accompanying drawing figures.

DETAILED DESCRIPTION OF THE PREFERRED EMBODIMENTS

Figure 1:
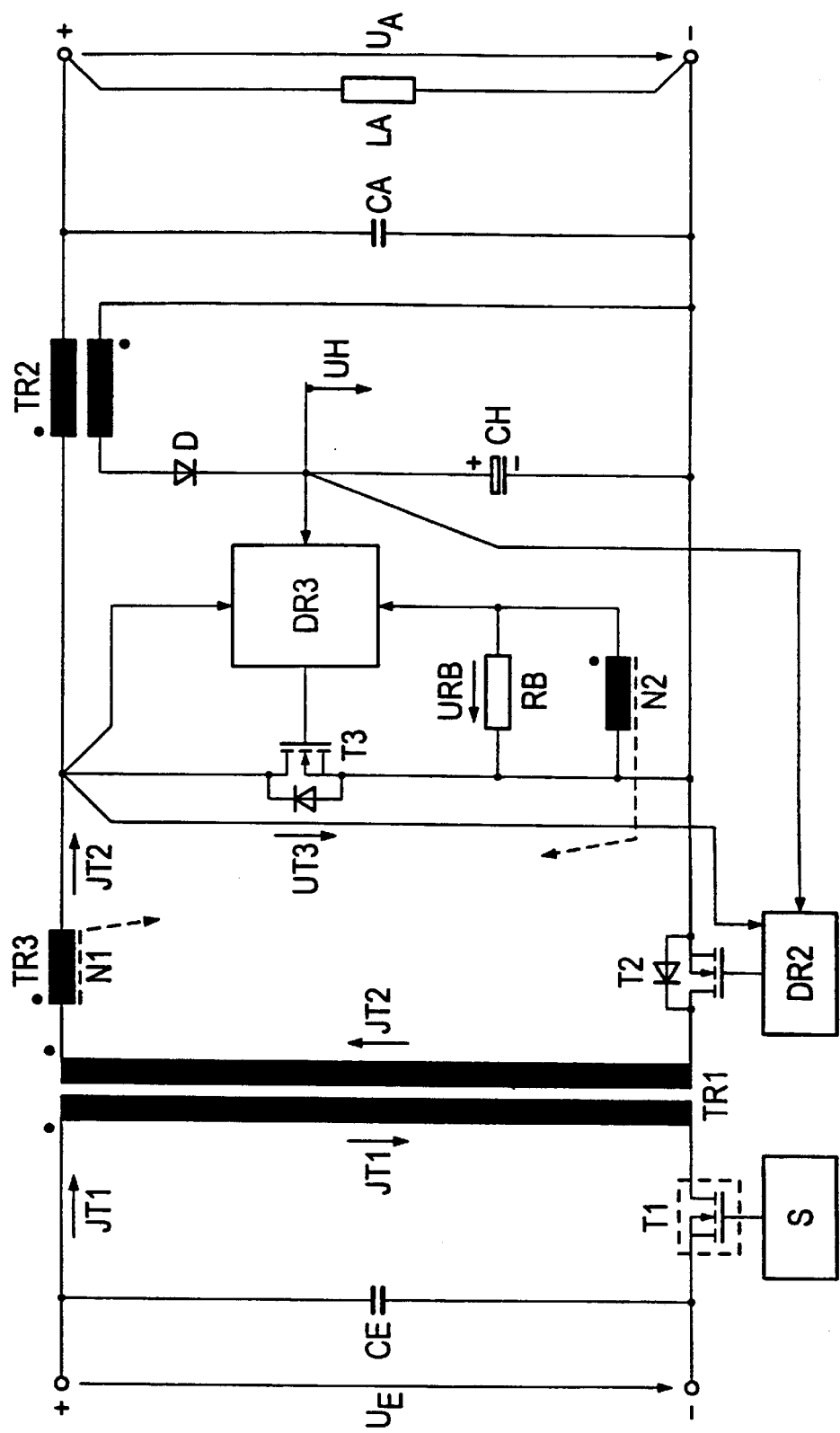
FIG. 1 shows a flow converter having automatic rectifiers.

FIG. 1 shows a single-cycle flow converter having automatic rectifiers.

A first circuit element T1, such as a field effect transistor, is arranged on the primary side of the single-cycle flow converter. The first circuit element T1 is driven via a first control unit S. A pulse-width modulation circuit for driving the first circuit element T1 is arranged in the first control unit S. An input capacitor CE is arranged parallel to the terminals of the single-cycle flow converter, whereby said terminals are situated at the input side.

A sensor unit and an output inductor TR2 are arranged in a main current path between a terminal of the coil of the transformer TR1 on the secondary side and a first terminal of the single-cycle flow converter on the output side. A current transformer TR3 is used a as sensor unit.

A second circuit element T2, such as a MOS field effect transistor having a body diode, is arranged between a further terminal of the coil of the transformer TR1 on the secondary side and a second terminal of the single-cycle flow converter on the output side.

A third circuit element T3, such as a MOS field effect transistor having a body diode, is connected to a first terminal between the current transformer TR3, and the output inductor TR2, and to a second terminal at the first terminal of the second circuit element T2. The control input of the second circuit element T2 is connected to a first driver circuit DR2. The first driver circuit DR2 is connected to the first terminal of the third circuit element T3.

A second driver circuit DR3 connected to a control input of the third circuit element T3 is connected to the first terminal of the third circuit element T3 and to a second terminal of the third circuit element T3 via a parallel circuit, comprising a burden resistor RB and coil N2 of the current transformer TR3 on the secondary side.

A blocking capacitor CA is arranged parallel to the output posts of the single-cycle flow converter at the output of the flow converter.

A unit for generating an auxiliary voltage UH is arranged on the secondary side of the single-cycle flow converter. This unit is formed by the output inductor TR2, a diode D and an electrolyte capacitor CH. The output voltage UA is translated by an output inductor TR2 for an auxiliary voltage UH. The auxiliary voltage UH is constant in this circuit arrangement and in further circuit arrangements, and is to be approximately 10 volt. On the basis of said auxiliary voltage, the second circuit element T2 is driven via the first driver circuit DR2 and the third circuit element T3 via the second driver circuit DR3.

Figure 2:
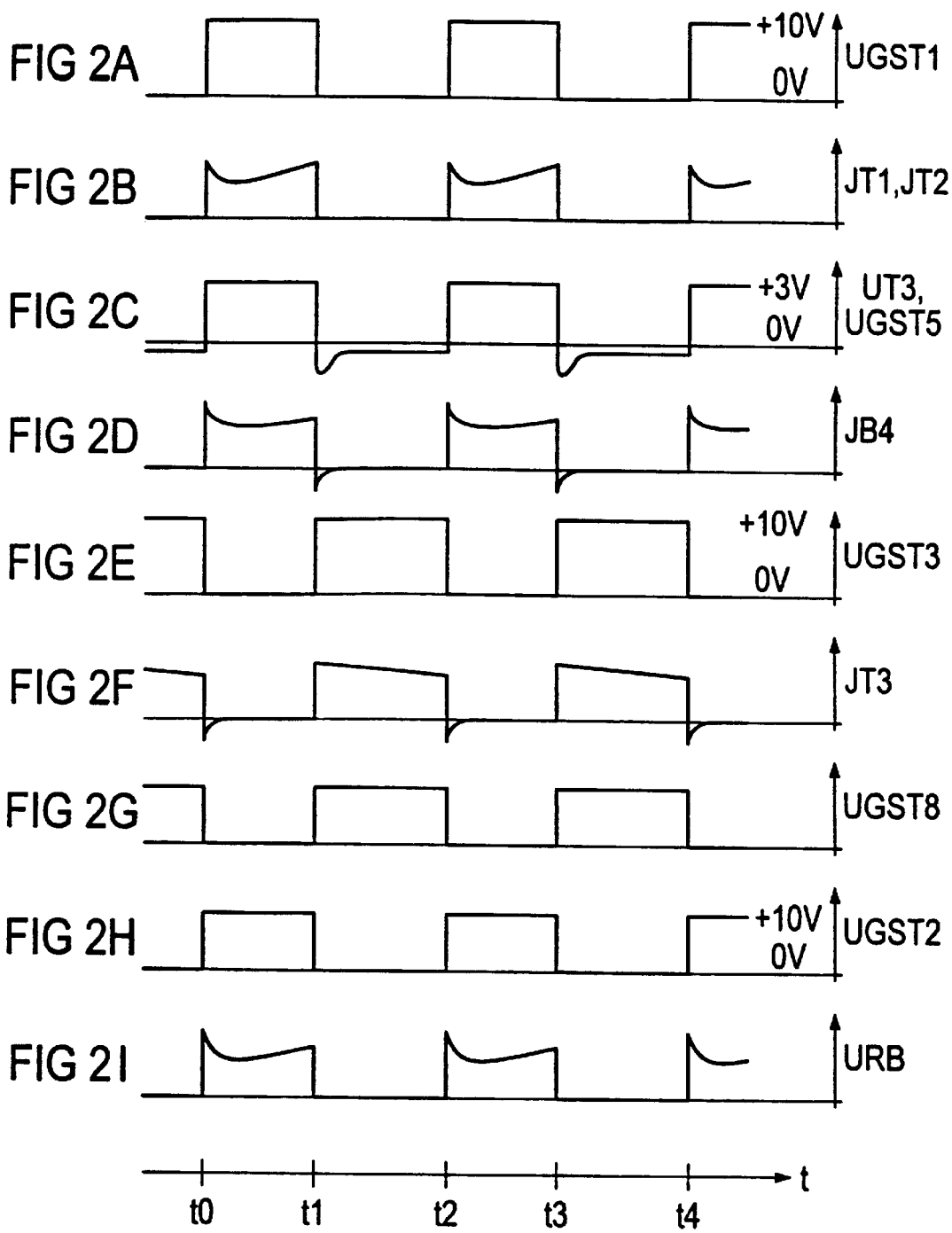
FIGS. 2a–2i show pulse diagrams according to the present invention.

The circuit behavior of the single-cycle flow converter is subsequently explained according to the present invention with references to the pulse diagrams shown in FIG. 2.

The circuit behavior of the single-cycle flow converter at the turn-on times t0, t2, t4 of the first circuit element T1 is such that when the first circuit element T1 is turned on by a control signal of the control circuit S, the current IT2 also starts to flow on the secondary side of the transformer TR1 as the current IT1 on the primary side of the transformer TR1 flows.

After the cited points in time in which the load current path of the first circuit element T1 is already of low impedance, the third circuit element T3 is still briefly functioning as a free-wheeling diode and leads the free-wheeling current of the output circuit. The circuit closes via the body diode of the blocked second circuit element T2. The third circuit element T3 forms a short circuit in this phase. The steep rise regarding the current IT2 through the third circuit element T3 is only limited by the leakage inductances of both circuits and of the transformer TR1.

The current IT2 flows opposite to the free-wheeling current impressed by the output inductor TR2 in the third circuit element T3 as shown in FIGS. 2b and 2f. The voltage at the load current path of the third circuit element T3 changes unnoticeably.

As the current IT2 rises fast on the secondary side of the transformer TR1, a burden voltage URB, as shown in FIG. 2i, is also generated at the burden resistor RB corresponding to the voltage ratio N1 to N2 of the current transformer TR3. This burden voltage URB at the burden resistance RB forms the turn-off criterion for the third circuit element T3. The second driver circuit DR3 is correspondingly triggered and blocks the third circuit element T3.

When the third circuit element T3 blocks, the voltage UT3 also rises to the converted value of the input voltage UE. The second circuit element T2 is driven via the first driver circuit DR2 and the load current path of the second circuit element T2 is driven to low impedance.

As soon as the third circuit element T3 is blocked, the commutation process is completed at the secondary side of the transformer TR1, and the second circuit element T2 takes the current IT2. The current guide of the current IT2 on the secondary side of the transformer TR1, ensues via the output inductor TR2, via a consumer and the low-impedance load current path of the second circuit element T2.

The circuit behavior of the single-cycle flow converter during the load current path of the first circuit element in the time intervals t0–t1, t2–t3, continues in this manner, whereby the load current path is driven to low impedance.

FIG. 2a shows the voltage UGST1 at the control input of the first circuit element T1, and FIG. 2h shows the control voltage UGST2 and the voltage at the load current path of the second circuit element T2.

When the load current path of the first circuit element T1 is of low impedance, the load current path of the second circuit element 7 is also of low impedance on the secondary side of the single-cycle flow converter.

The current IT1 impressed on the primary side of the single-cycle flow converter is translated by the transformer TR1 into a current IT2 on the secondary side of the transformer TR1. The current IT2 flows through the current transformer TR3 and the output inductor TR2.

The voltage UT3 situated at the load current path of the third circuit element T3 is used for driving the first driver circuit DR2 and the second driver circuit DR3. This voltage UT3 changes directly proportional with the value of the input voltage UE upon consideration of the conversion ratio of the transformer TR1. The voltage UT3 primarily is a square wave alternating voltage, as shown in FIG. 2c.

The circuit behavior of the single-cycle flow converter at the points in time t1, t3, . . . , at which time the load current path of the first circuit element T1 is of high impedance.

In the first moment, the body diode arranged between the second and first terminal of the third circuit element T3, takes the current flow. As a result thereof, the voltage of UT3 breaks down. Therefore, the second circuit element T2 is turned off and the third circuit element T3 is turned on.

In the moment of blocking the first circuit element T1, the current IT1 and IT2 reduces to zero amperes. The voltage at the third circuit element T3 jumps from its maximum positive value to a slightly negative value, since the body diode of the third circuit element T3 abruptly assumes the current impressed by the current transformer TR3. The load current path of the second circuit element T2 is thus switched low impedance. The load current path of the third circuit element T3 becomes low impedance. The third circuit element T3 acts as free-wheeling diode and takes the free-wheeling current impressed by the output inductor TR2.

At the points in time t1, t3, . . . , while the first circuit element T1 becomes high impedance as shown in FIG. 2a, the voltage UT3 across the load current path of the third circuit element T3 has a low voltage exhibiting a negative value with regard to the voltage arrow as shown in FIG. 2c. The free-wheeling current flowing through the third circuit element T3 during this phase causes a voltage at the load current path of the third circuit element T3, since it flows from the second terminal to the first terminal of the third circuit element T3. This voltage exhibits a low negative value with regard to the voltage arrow shown in FIG. 1.

While the third circuit element T3 acts as free-wheeling diode, the third circuit element T3 is fully advanced as shown in FIGS. 2c and 2e by the voltage UT3, which approaches zero volts.

The circuit behavior of the single-cycle flow converter between the points in time t1–t2, t3–t4 occurs such that the third circuit element T3 acts as free-wheeling diode during these time intervals, and the first circuit element T1 and the second circuit element T2 are blocked.

Figure 3:
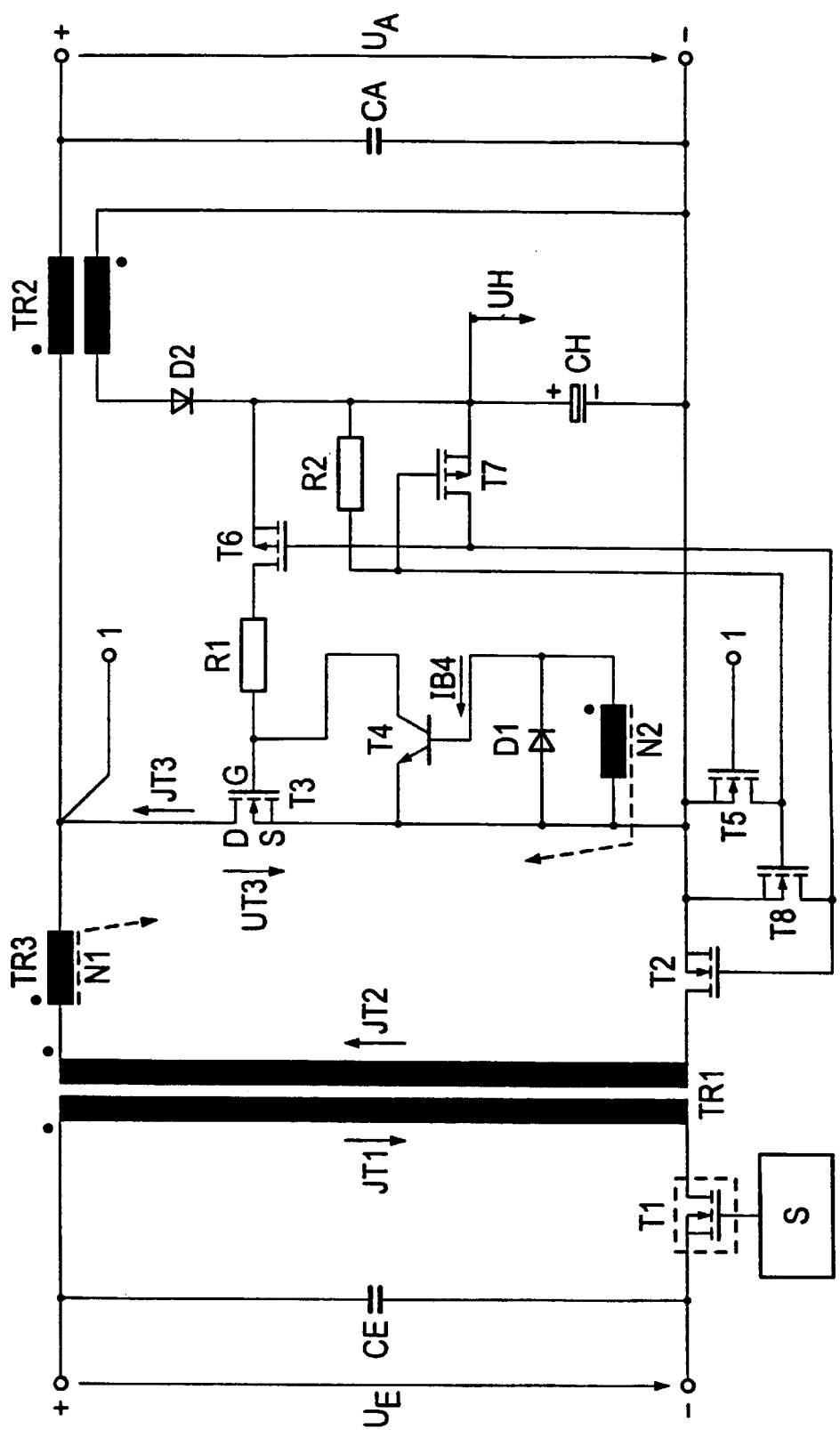
FIG. 3 shows a further flow converter having automatic rectifiers according to the present invention.

FIG. 3 shows an embodiment of the circuit shown in FIG. 1. In contrast to the circuit shown in FIG. 1, for the circuit in FIG. 3, the first driver circuit DR2 is replaced by a fifth field effect transistor T5, by an eighth field effect transistor T8 an by a seventh field effect transistor T7, the second driver circuit DR3 is replaced by a sixth field effect transistor T6 and the burden resistor is replaced by a first diode D1 and a fourth circuit element T4, which can be a bipolar transistor, for example. The cathode of the diode D1 is connected to the control input of the bipolar transistor T4.

The first diode D1 is arranged parallel to the second winding N2 of the current transformer TR3. A base emitter path of the bipolar transistor T4 is arranged parallel to the first diode D1. The emitter terminal of the bipolar transistor T4 is connected to the source terminal S and the collector terminal of the bipolar transistor T4 is connected to the control input G of the third circuit element T3. A control input of the fifth field effect transistor T5 is connected to a first terminal D of the third circuit element T3 and the drain terminal of the fifth field effect transistor T5 is connected to a control input of the eighth field effect transistor T8.

The load current path of the eighth field effect transistor T8 extends parallel to the control path of the second circuit element T2. The control input of the eighth field effect transistor T8 is connected to a control input of the seventh field effect transistor T7 and is connected to the auxiliary voltage source UH via a resistance R2.

The control input of the second circuit element T2 is connected to a control input of the sixth field effect transistor T6 and to a drain terminal of the seventh field effect transistor T7. A connection between the control input of the third circuit element T3 and the auxiliary voltage source UH is created by the load current path of the sixth field effect transistor T6 and the resistance R1.

The following function description is limited to the switching processes at the points in time t0, t2, t4, as indicated in FIGS. 2a–2i.

After the load current path of the first circuit element T1 has become low impedance and the current IT2 flows on the secondary side of the converter, the third circuit element T3, which has already acted as free-wheeling diode in the secondary circuit of the transformer TR1 in the past time intervals t1–t2, t3–t4, becomes blocking. In the secondary winding N2 of the current transformer TR3, the current IT2 is translated into the current IB4 by the winding ratio N1/N2 of the current transformer TR3, as shown in FIG. 2d. The current IB4 flows into the base of the bipolar transistor T4 and makes it conducting. In this way, the gate source path GS of the third circuit element T3 is short-circuited or reduced to the residual voltage between the emitter and the collector of the bipolar transistor T4. The control input of the third circuit element T3 has been previously connected via the load current path of the sixth field effect transistor T6 to the auxiliary voltage source UH.

The resistance R1 arranged in the control path has a relatively low impedance resistance value, and resistance R1 is necessary for generating a voltage difference when the bipolar transistor T4 becomes conducting. Shortly after the current IT2 flows through the primary winding N1 of the current transformer TR3, the control path SG of the third circuit element T3 is short-circuited, and the load current path SD of the third circuit element T3 becomes high impedance. When the third circuit element T3 blocks, the voltage is also high between the time intervals to–t1, t2–t3, as shown in FIG. 2c.

At the time of blocking the third circuit element T3, the voltage UT3 is adjacent at the high impedance load current path SD of the third circuit element T3. The voltage UT3 corresponds to the input voltage UE translated by the transformer TR1.

The second circuit element T2 is conductively driven via the fifth field effect transistor T5, which cancels the short-circuit of the eighth field effect transistor T8, and the auxiliary voltage UH is present at the control input of the second circuit element T2 via the load current path of the seventh transistor T7.

On the basis of the first diode D1, the magnetization current can be dismantled via the secondary winding N2 of the current transformer TR3 when the current IT2 is interrupted.

Figure 4:
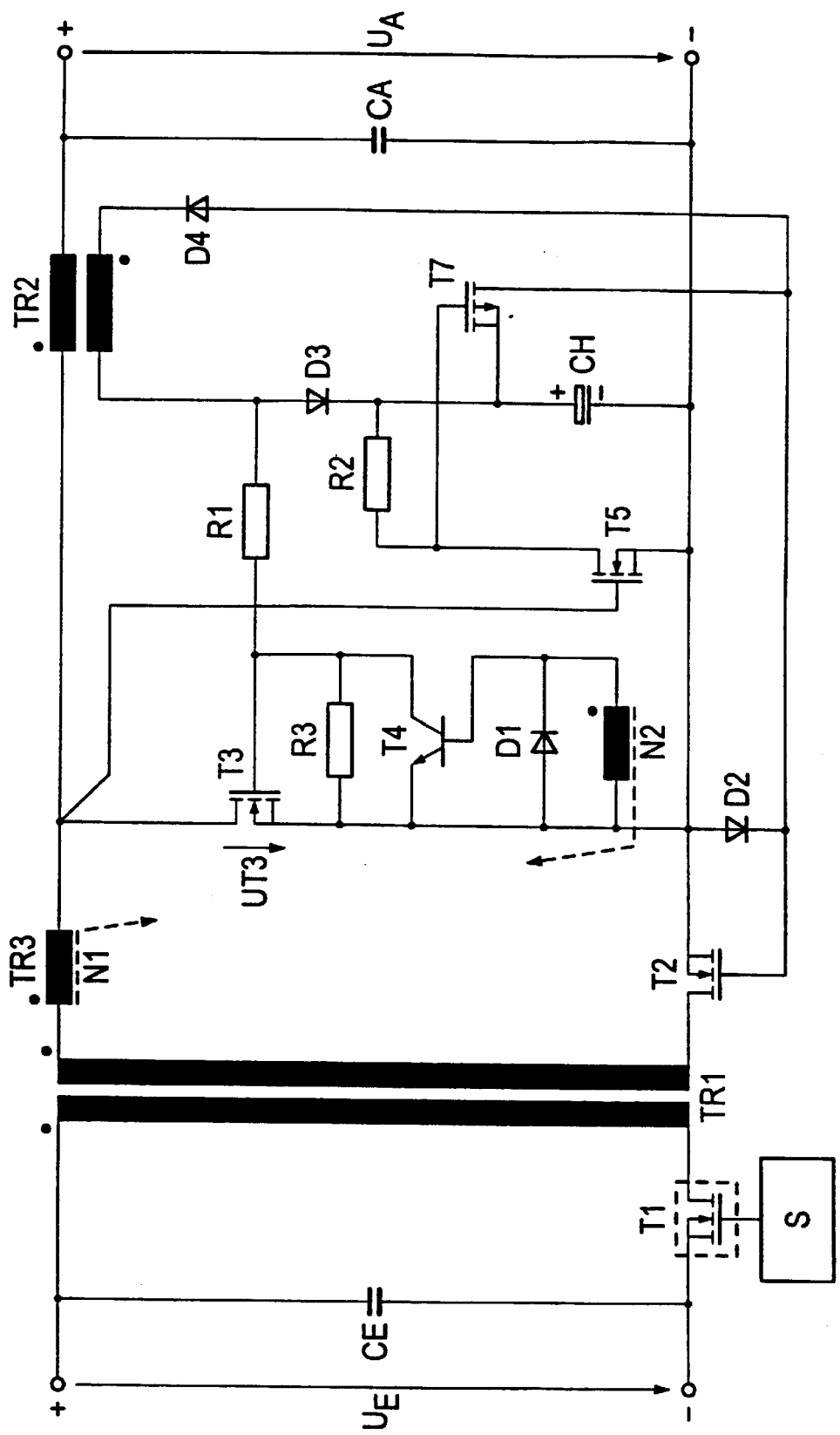
FIG. 4 shows a further flow converter having automatic rectifiers according to the present invention.

FIG. 4 shows another embodiment of a single-cycle flow converter having automatic rectifiers. This embodiment differs from the embodiment of FIG. 3 in that the voltage at the auxiliary winding of the output inductor TR2 is also used for driving the third circuit element T3 with a positive voltage.

When the first circuit element T1 blocks and the commutation flows onto the third circuit element T3, the output voltage UA minus the voltage that is present at the current transformer TR3 is present at the output inductor TR2. This output voltage UA is translated onto the auxiliary winding of the output inductor TR2. The gate of the third circuit element T3 is driven by this voltage. The control input G of the third circuit element T3 is driven via the resistance R1 and lasts while the load current path of the first circuit element T1 is high impedance.

As described in FIG. 3, the third circuit element T3 is turned off in a defined fashion via the current transformer TR3, and the bipolar transistor T4.

The fifth transistor T5 and the seventh transistor T7 serve the purpose of generating a defined control voltage for the second circuit element T2.

The second circuit element T2 is turned off when the third circuit element T3 is turned on. The off-state of the second circuit element T2 is maintained by the resistance R1 and the resistance R3 and by the diodes D2, D4, as well as by the auxiliary winding of the output inductor TR2, as long as the third circuit element T3 assumes the function of a free-wheeling diode. Given a change in polarity at the auxiliary winding of the output inductor TR2, the voltage at the auxiliary winding is decoupled by the diode D4 from the circuit.

Figure 5:
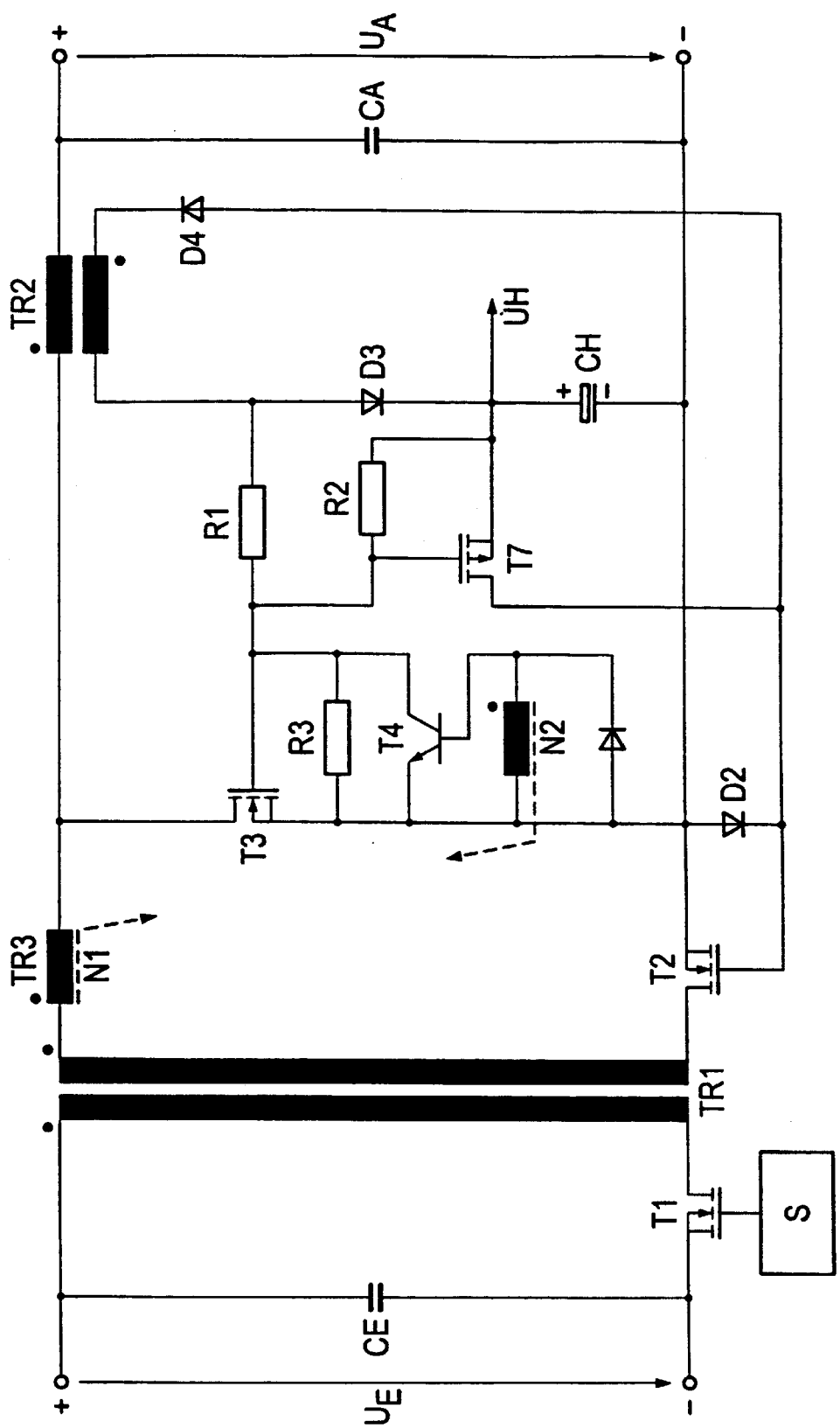
FIG. 5 shows a version of a flow rectifier having automatic rectifiers according to the present invention.

FIG. 5 shows another embodiment of the circuit embodiment of FIG. 4.

The fifth transistor T5 is foregone in FIG. 5. The second circuit element T2 with the voltage at the gate of the third circuit element T3 is conductively driven via the conductively driven seventh transistor T7. This voltage then is adjacent at the gate of the third circuit element T3, when, as already described above, the bipolar transistor T4 becomes conducting and when the gate source voltage of the third circuit element T3 is reduced to the emitter collector voltage of the bipolar transistor T4. The voltage at the gate of the third circuit element T3 is also present at the gate of the seventh transistor T7, a P-channel transistor.

After the load current path of the seventh transistor T7 has become conducting, the auxiliary voltage UH is present at the gate of the second circuit element T2. As long as the current IT2 flows through the coil N1 of the current transformer TR3, the base of the bipolar transistor T4 is also driven, and the third circuit element T3 remains blocked in a defined way.

After the commutation process itself, the resistance R1 also remains without current, since the polarity of the voltage is reversed in this switching state at the auxiliary winding of the output inductor TR2, so that this part of the circuit remains without current.

The primary winding of the current transformer TR3, which supplies the turnoff criterion for the third circuit element T3, can also be arranged in the primary circuit of the transformer TR1.

Although modifications and changes may be suggested by those skilled in the art to which this invention pertains, it is the intention of the inventor to embody within the patent warranted hereon all changes and modifications that may reasonably and properly come under the scope of his contribution to the art.

What is claimed is:

1. A circuit for automatic rectification in a converter, the converter comprising a transformer having a primary side, a secondary side, a first circuit element on the primary side, and the circuit, the circuit comprising on the secondary side, a sensor unit for outputting a control signal determining current flow on the primary side or the secondary side, a second circuit element having a control input and a load current path, and a third circuit element having a control input, first and second terminals and a load current path, the third circuit element connected with its load current path parallel to the transformer, the second circuit element connected with its load current path in a main current path between a terminal of the secondary side and a first terminal of the third circuit element, the control input of the second circuit element connected to the second terminal of the third circuit element, whereby the control signal outputted by the sensor unit is applied to the control input of the third circuit element, and the load current path of the third circuit element is switched to a high impedance.

2. The circuit according to claim 1, wherein the sensor unit is a current transformer having a primary side and a secondary side.

3. The circuit according to claim 2, wherein the current transformer unit has a coil on the primary side and a coil including a burden resistor on the secondary side, the burden resistor connected in parallel to the coil on the secondary side and generates a control signal, the coil on the primary side is arranged in a main current path on one of the primary side or the secondary side of the transformer.

4. The circuit arrangement according to claim 3, wherein a second winding of the output inductor is provided for generating a constant auxiliary voltage.

5. The circuit arrangement according to claim 2, wherein a first diode and a control path of a bipolar transistor are arranged parallel to the coil of the current transformer unit on the secondary side, whereby the bipolar transistor is advanced with respect to a current flow, and the control signal at the control path of the bipolar transistor blocks the third circuit element.

6. The circuit arrangement according to claim 4, wherein a driver circuit is provided for driving the second circuit element and the third circuit element.

7. A method for automatic rectification in a converter having a transformer comprising a primary side and a secondary side, and having a first circuit element on the primary side and an alternating voltage applied to the primary side, the method comprising the steps of:

providing a second circuit element and a third circuit element on the secondary side of the transformer, the third element having a first terminal and a second terminal;

connecting the third circuit element with its load current path parallel to the transformer on the secondary side;

connecting the second circuit element with its load current path in a main current path between the secondary side and the first terminal of the load current path of the third circuit element;

connecting the control input of the second circuit element to the second terminal of the third circuit element;

generating a control signal during current flow in one of the primary side or the secondary side; and switching the load current path of the third circuit element to a high impedance based on the control signal.

* * * * *